(12) United States Patent
Ma et al.

(10) Patent No.: US 10,036,915 B2
(45) Date of Patent: Jul. 31, 2018

(54) METHOD FOR MANUFACTURING PDLC DISPLAY DEVICE AND PDLC DISPLAY DEVICE

(71) Applicant: Shenzhen China Star Optoelectronics Technology Co., Ltd., Shenzhen (CN)

(72) Inventors: Chao Ma, Shenzhen (CN); Yungjui Lee, Shenzhen (CN); Xiaolong Ma, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 247 days.

(21) Appl. No.: 14/914,639

(22) PCT Filed: Dec. 24, 2015

(86) PCT No.: PCT/CN2015/098635
§ 371 (c)(1),
(2) Date: Feb. 26, 2016

(87) PCT Pub. No.: WO2017/080034
PCT Pub. Date: May 18, 2017

(65) Prior Publication Data
US 2017/0261779 A1  Sep. 14, 2017

(30) Foreign Application Priority Data
Nov. 9, 2015  (CN) .......................... 2015 1 0756224

(51) Int. Cl.
*G02F 1/1334* (2006.01)
*G02F 1/1335* (2006.01)
(Continued)

(52) U.S. Cl.
CPC .......... *G02F 1/1334* (2013.01); *G02F 1/1341* (2013.01); *G02F 1/1368* (2013.01);
(Continued)

(58) Field of Classification Search
CPC ......... G02F 1/1334; G02F 2001/13415; G02F 1/133512; G02F 1/133377; G02F 2001/133614
See application file for complete search history.

(56) References Cited

U.S. PATENT DOCUMENTS

2004/0184131 A1*  9/2004  Kurashina ......... G02F 1/136259
                                                359/245
2004/0189893 A1*  9/2004  Choi .................... G02F 1/1334
                                                349/86
(Continued)

*Primary Examiner* — Jia Pan
(74) *Attorney, Agent, or Firm* — Leong C. Lei

(57) ABSTRACT

The present invention provides a method for manufacturing a PDLC display device and a PDLC display device. The method for manufacturing a PDLC display device according to the present invention provides a black matrix and a base plate that collectively delimit a plurality of pixel cavities and fills a mixture of PDLC and red QDs, a mixture of PDLC and green QDs, and PDLC respectively into the plurality of pixel cavities to form a PDLC substrate, which is laminated with an array substrate, and installed with a blue light backlight module, so as to form a PDLC display device. Light leakage and color mixture can be eliminated and processes related to alignment layers and polarizers can be saved to thereby increase the manufacturing efficiency and lower the manufacturing cost. The PDLC display device according the present invention is manufactured with the above-described method and demonstrates at least four displaying modes of red, green, blue, and indistinctness, allowing for use in applications where unique effects are required, and helping eliminate light leakage and color mixture and also requiring no alignment layer and polarizer (Continued)

so that the manufacturing efficiency is high and the manufacturing cost is low.

11 Claims, 5 Drawing Sheets

(51) Int. Cl.
G02F 1/1333 (2006.01)
G02F 1/1339 (2006.01)
G02F 1/1341 (2006.01)
G02F 1/1343 (2006.01)
G02F 1/1368 (2006.01)

(52) U.S. Cl.
CPC ...... *G02F 1/13394* (2013.01); *G02F 1/13439* (2013.01); *G02F 1/133377* (2013.01); *G02F 1/133512* (2013.01); *G02F 1/133621* (2013.01); *G02F 2001/133614* (2013.01); *G02F 2201/121* (2013.01); *G02F 2201/123* (2013.01); *G02F 2201/52* (2013.01); *G02F 2202/28* (2013.01); *G02F 2202/36* (2013.01)

(56) References Cited

U.S. PATENT DOCUMENTS

| | | | | |
|---|---|---|---|---|
| 2008/0158480 | A1* | 7/2008 | Ii | G02F 1/133617 349/71 |
| 2010/0208172 | A1* | 8/2010 | Jang | B82Y 20/00 349/71 |
| 2011/0261294 | A1* | 10/2011 | Jang | G02B 5/201 349/86 |
| 2011/0281388 | A1* | 11/2011 | Gough | B82Y 20/00 438/47 |
| 2012/0087107 | A1* | 4/2012 | Kunimasa | G02F 1/133514 362/84 |
| 2013/0242228 | A1* | 9/2013 | Park | G02F 1/133617 349/61 |
| 2014/0192294 | A1* | 7/2014 | Chen | F21V 9/08 349/69 |
| 2014/0313691 | A1* | 10/2014 | Kaida | G02F 1/133504 362/19 |
| 2015/0301408 | A1* | 10/2015 | Li | G02F 1/133621 362/84 |

\* cited by examiner

METHOD FOR MANUFACTURING PDLC DISPLAY DEVICE AND PDLC DISPLAY DEVICE

BACKGROUND OF THE INVENTION

1. Field of the Invention

The present invention relates to the field of display technology, and in particular to a method for manufacturing a polymer dispersed liquid crystal (PDLC) display device and a PDLC display device.

2. The Related Arts

A thin-film transistor liquid crystal display (TFT-LCD) generally comprises a color filter (CF) substrate and a thin-film transistor (TFT) substrate. The substrates have inside surfaces facing each other and comprising transparent electrodes provided thereon. A layer of liquid crystal is interposed between the two substrates. The liquid crystal display controls the orientation of liquid crystal molecules through application of an electric field in order to change the state of polarization of light and selectively blocks or passes a light path by means of polarizers so as to achieve the purpose of displaying.

It can be said that for almost all sizes of display devices, including large, medium, and small sizes, the LCDs take an absolutely predominant share of the market. In today's LCD market of applications, an increasing demand is emerging for terminal displays used in large shopping malls, supermarkets, hotel lobbies, theaters and cinemas, education, medication, and other public sites where people crowd and the yearly increasing rate is 30%.

On the other hand, polymer dispersed liquid crystal (PDLC), serving as a liquid crystal light regulation valve, has been paid close attention to and widely used in recent years and is a material that is formed by mixing low molecule liquid crystal and pre-polymer to generate a polymerization reaction under certain conditions so as to form micrometer-size liquid crystal droplets uniformly dispersed in a high-molecule polymer network and exhibits characteristics of electro-optic response by means of anisotropic dielectric property of the liquid crystal molecules for being operable between a scattering state and a transmission state and demonstrating a predetermined grey level. A PDLC display device offers various advantages, such as omitting the use of polarizers and alignment layers, being easy to manufacture, being easy to make a large-sized flexible display device, and has been widely used in optic modulators, thermal-sensitive and pressure-sensitive devices, electrically-controlled glass, light valves, projection displaying, and electronic books. The operation principle is that no regular electric field can be established between films without an external voltage applied and optic axes of liquid crystal droplets are oriented stochastically, demonstrating a disorderly condition, so that effective refractive index n0 does not match refractive index np of the polymer. Incident light would be strongly scattered so that the film shows an opaque or translucent condition. When an external voltage is applied, the optical axes of the liquid crystal drops are aligned in a direction normal to a surface of the film, meaning being consistent with the direction of the electric field. Ordinary refractive index of the droplets and the refractive index of the polymer generally match each other so that there is no apparent interface therebetween thereby forming a generally homogeneous medium, and thus, no scattering will happen to incident light and the film demonstrates a transparent condition. Thus, in a condition of being driven by an external electric field, PDLC exhibits the characteristics of being a light switch and the degree of transparency is increased according to a predetermined curve when the applied voltage is increased.

In addition, quantum dots, as a newly emerging material for display devices, have been widely accepted and paid close attention to. Quantum dots are a quasi-zero-dimensional nanometer-sized material and are generally formed of a small amount of atoms. Roughly speaking, a quantum dot has a size that is les than 100 nm in each of the three dimensions and shows an external appearance as an extremely small dot-like article with movement of an internal electron thereof being confined in each direction so as to exhibit a significant quantum confinement effect. The quantum dot shows an excitation spectrum that is wide and distributed continuously and an emission spectrum that is narrow and symmetric, providing various advantages, including color controllability, high photochemistry stability, and extended fluorescent life time, thereby making it an ideal luminescent material. Currently, quantum dots are classified as two types according to the ways of energy acquisition, one being photoluminescence and the other electroluminescence. The color of light emitting from a quantum dot is achieved with the size effect of the quantum dot, namely controlling the shape, structure, and size of the quantum dot to control the electron states of energy band gap, magnitude of exciton bonding energy, and exciton energy blue shifting.

SUMMARY OF THE INVENTION

An object of the present invention is to provide a method for manufacturing a polymer dispersed liquid crystal (PDLC) display device, which combines PDLC and quantum dots (QDs) to eliminate the phenomena of light leakage and color mixture existing in a conventional PDLC display device.

Another object of the present invention is to provide a PDLC display device, which eliminates light leakage and color mixture by combining PDLC and QDs.

To achieve the above objects, the present invention provides a method for manufacturing a PDLC display device, which comprises the following steps:

(1) providing a first base plate, coating a black matrix material on the first base plate, and subjecting the black matrix material to a patterning operation to form a black matrix, wherein the first base plate and the black matrix collectively delimit a plurality of pixel cavities;

(2) forming a common electrode on and completely covering the black matrix, the plurality of pixel cavities, and the first base plate;

(3) providing a mixture of PDLC and red QDs, a mixture of PDLC and green QDs, and PDLC; and, with every three ones of the pixel cavities that are adjacent to each other collectively defining a pixel unit, filling the mixture of PDLC and red QDs and the mixture of PDLC and green QDs into first and second pixel cavities of the pixel unit to respectively form a red sub-pixel cavity and a green sub-pixel cavity, and filling the PDLC into a third pixel cavity of the pixel unit to form a blue sub-pixel cavity, thereby forming a PDLC substrate;

(4) providing an array substrate, wherein the array substrate comprises a second base plate, a thin-film transistor layer arranged on the second base plate, and a pixel electrode layer arranged on the thin-film transistor layer; the pixel electrode layer comprises a plurality of pixel electrodes respectively corresponding to the plurality of pixel cavities;

(5) coating enclosure resin along a circumference of the PDLC substrate or the array substrate and conducting vacuum lamination of the PDLC substrate and the array substrate so as to form a PDLC display panel; and (6) providing a backlight module and combining the PDLC display panel and the backlight module together to form a PDLC display device, wherein the backlight module emits blue light.

In step (2), the common electrode is formed through sputtering.

The common electrode and the pixel electrode are both transparent electrodes.

In the mixture of PDLC and red QDs and the mixture of PDLC and green QDs provided in step (3), a mass ratio between the red QDs or the green QDs and the PDLC is 5%-10%.

In step (5), the enclosure resin contains therein spacing materials that maintain a spacing distance between the first base plate and the second base plate.

The present invention also provides a PDLC display device, which comprises a PDLC display panel and a backlight module arranged below the PDLC display panel; wherein the PDLC display panel comprises a PDLC substrate, an array substrate arranged opposite to the PDLC substrate, and enclosure resin bonding the PDLC substrate and the array substrate together;

the PDLC substrate comprises a first base plate, a black matrix arranged on the first base plate, a common electrode arranged on the black matrix and the first base plate, a mixture of PDLC and red QDs, a mixture of PDLC and green QDs, and PDLC; and the black matrix and the first base plate collectively delimit a plurality of pixel cavities, and every three adjacent ones of the pixel cavities form a pixel unit, wherein first and second pixel cavities of the pixel unit are respectively filled with the mixture of PDLC and red QDs and the mixture of PDLC and green QDs to respectively form a red sub-pixel cavity and a green sub-pixel cavity, and a third pixel cavity of the pixel unit is filled with the PDLC to form a blue sub-pixel cavity;

the array substrate comprises a second base plate, a thin-film transistor (TFT) layer arranged on the second base plate, and a pixel electrode layer arranged on the thin-film transistor layer; and the pixel electrode layer comprises a plurality of pixel electrodes respectively corresponding to the plurality of pixel cavities; and the backlight module emits blue light; and the red QDs of the red sub-pixel cavity and the green QDs of the green sub-pixel cavity, when excited by blue light, emit red light and green light respectively, while the PDLC filled in the blue sub-pixel cavity allows for transmission of blue backlighting therethrough to thereby display blue color.

The common electrode and the pixel electrode are both transparent electrodes.

In the mixture of PDLC and red QDs and the mixture of PDLC and green QDs, a mass ratio between the red QDs or the green QDs and the PDLC is 5%-10%

The enclosure resin contains therein spacing materials for maintaining a spacing distance between the first base plate and the second base plate.

The first base plate and the second base plate are both transparent plates.

The present invention further provides a PDLC display device, which comprises a PDLC display panel and a backlight module arranged below the PDLC display panel; wherein the PDLC display panel comprises a PDLC substrate, an array substrate arranged opposite to the PDLC substrate, and enclosure resin bonding the PDLC substrate and the array substrate together;

the PDLC substrate comprises a first base plate, a black matrix arranged on the first base plate, a common electrode arranged on the black matrix and the first base plate, a mixture of PDLC and red QDs, a mixture of PDLC and green QDs, and PDLC; and the black matrix and the first base plate collectively delimit a plurality of pixel cavities, and every three adjacent ones of the pixel cavities form a pixel unit, wherein first and second pixel cavities of the pixel unit are respectively filled with the mixture of PDLC and red QDs and the mixture of PDLC and green QDs to respectively form a red sub-pixel cavity and a green sub-pixel cavity, and a third pixel cavity of the pixel unit is filled with the PDLC to form a blue sub-pixel cavity;

the array substrate comprises a second base plate, a TFT layer arranged on the second base plate, and a pixel electrode layer arranged on the thin-film transistor layer; and the pixel electrode layer comprises a plurality of pixel electrodes respectively corresponding to the plurality of pixel cavities; and the backlight module emits blue light; and the red QDs of the red sub-pixel cavity and the green QDs of the green sub-pixel cavity, when excited by blue light, emit red light and green light respectively, while the PDLC filled in the blue sub-pixel cavity allows for transmission of blue backlighting therethrough to thereby display blue color;

wherein the common electrode and the pixel electrode are both transparent electrodes;

wherein in the mixture of PDLC and red QDs and the mixture of PDLC and green QDs, a mass ratio between the red QDs or the green QDs and the PDLC is 5%-10%;

wherein the enclosure resin contains therein spacing materials for maintaining a spacing distance between the first base plate and the second base plate; and wherein the first base plate and the second base plate are both transparent plates.

The efficacy of the present invention is that the present invention provides a method for manufacturing a PDLC display device, wherein a black matrix and a base plate collectively delimit a plurality of pixel cavities in such a way that every three adjacent ones of the pixel cavities form a pixel unit, and a mixture of PDLC and red QDs and a mixture of PDLC and green QDs are respectively filled into the first and second pixel cavities of the pixel unit to respectively form a red sub-pixel and a green sub-pixel and the third pixel cavity of the pixel unit is filled with PDLC to form a blue sub-pixel, thereby forming a PDLC substrate, which is laminated with an array substrate, and combined with a blue-light backlight module to form the PDLC display device. Light leakage and color mixture that are present in a conventional PDLC display device can be eliminated and processes of alignment layers and polarizers can also be saved to thereby increase manufacturing efficiency and lower down manufacturing cost. The PDLC display device of the present invention that is manufactured with the above-described method demonstrates at least four displaying modes of red, green, blue, and indistinctness, allowing for use in applications where unique effects are required, and helping eliminate light leakage and color mixture occurring in an existing PDLC display device, and also requiring no alignment layer and polarizer so that the manufacturing efficiency is high and the manufacturing cost is low.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
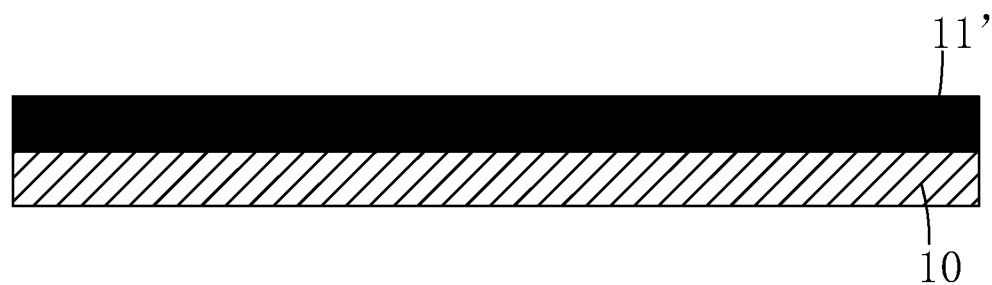
FIGS. 1 and 2 are schematic views illustrating step 1 of a method for manufacturing a polymer dispersed liquid crystal (PDLC) display device according to the present invention.
Figure 2:
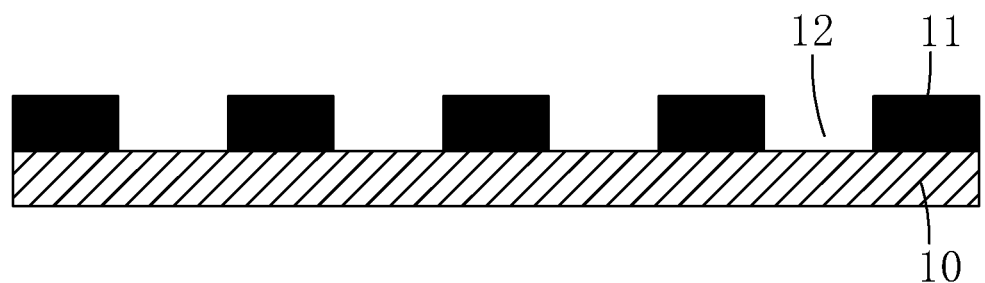

Firstly, the present invention provides a method for manufacturing a polymer dispersed liquid crystal (PDLC) display device, which comprises the following steps:

Step 1: as shown in FIGS. 1-2, providing a first base plate 10, coating a black matrix material 11' on the first base plate 10, and subjecting the black matrix material 11' to a patterning operation to form a black matrix 11, wherein the first base plate 10 and the black matrix 11 collectively delimit a plurality of pixel cavities 12.

Specifically, the first base plate 10 is a transparent plate, and preferably, the first base plate 10 is a glass plate.

Figure 3:
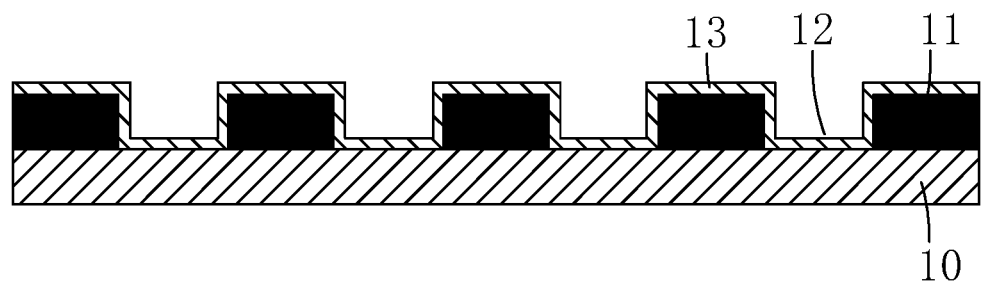
FIGS. 3 and 4 are schematic views illustrating step 2 of the method for manufacturing a PDLC display device according to the present invention.
Figure 4:
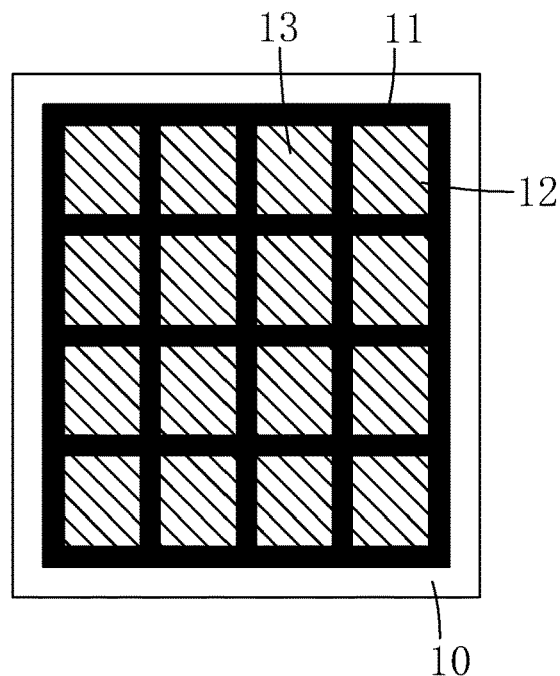

Step 2: as shown in FIGS. 3-4, forming a common electrode 13 on and completely covering the black matrix 11, the plurality of pixel cavities 12, and the first base plate 10.

Specifically, the entire common electrode 13 is formed through sputtering.

Specifically, the common electrode 13 is a transparent electrode, and preferably, the common electrode 13 is formed of a material comprising indium tin oxide (ITO) or indium zinc oxide (IZO).

Figure 5:
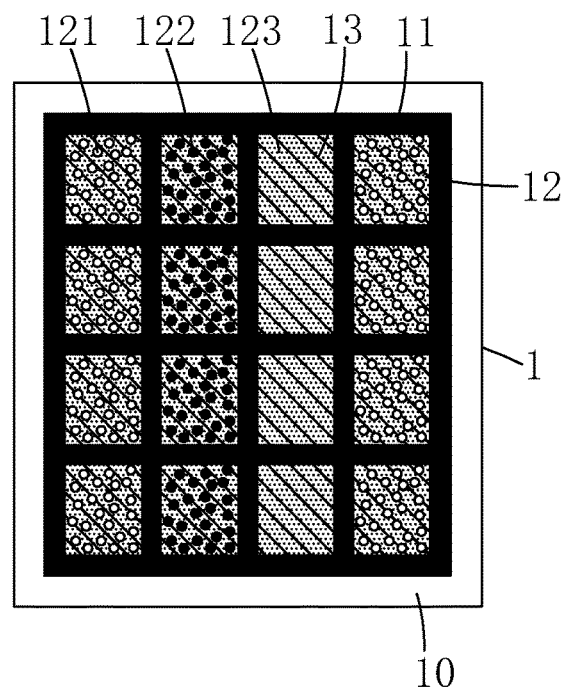
FIG. 5 is a schematic view illustrating step 3 of the method for manufacturing a PDLC display device according to the present invention.

Step 3: as shown in FIG. 5, providing a mixture of PDLC and red quantum dots (QDs), a mixture of PDLC and green QDs, and PDLC; and, with every three ones of the pixel cavities 12 that are adjacent to each other collectively defining a pixel unit, filling the mixture of PDLC and red QDs and the mixture of PDLC and green QDs into first and second pixel cavities 12 of the pixel unit to respectively form a red sub-pixel cavity 121 and a green sub-pixel cavity 122, and filling the PDLC into a third pixel cavity 12 of the pixel unit to form a blue sub-pixel cavity 123, thereby forming a PDLC substrate 1.

Specifically, the red QDs of the red sub-pixel cavity 121 and the green QDs of the green sub-pixel cavity 122, when excited by blue light, emit red light and green light respectively, while the PDLC filled in the blue sub-pixel cavity 123 allows for transmission of blue backlighting therethrough to thereby display blue color.

Specifically, in the PDLC substrate 1, each of the pixel units may further comprise a white sub-pixel cavity, and the white sub-pixel cavity is filled with a mixture of red QDs, green QDs, and PDLC.

Specifically, in the PDLC substrate 1, each of the pixel units may further comprise a yellow sub-pixel cavity, and the yellow sub-pixel cavity is filled with a mixture of yellow QDs and the PDLC.

Specifically, in the mixture of PDLC and red QDs and the mixture of PDLC and green QDs, a mass ratio between the red QDs or the green QDs and the PDLC is 5%-10%.

Figure 6:
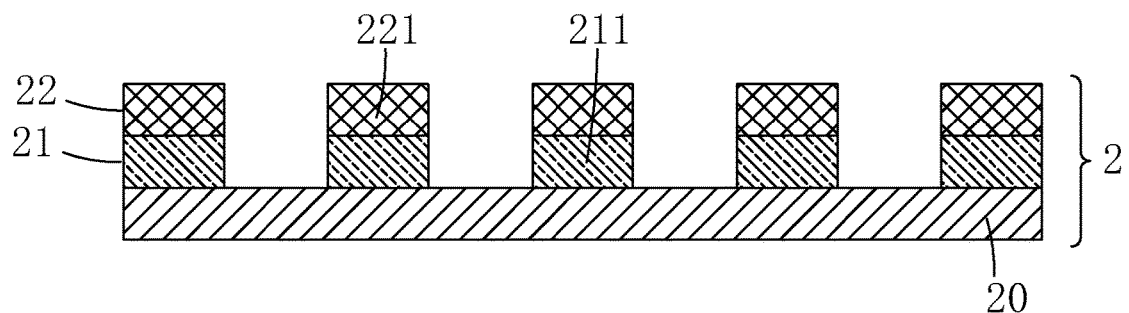
FIGS. 6 and 7 are schematic views illustrating step 4 of the method for manufacturing a PDLC display device according to the present invention.
Figure 7:
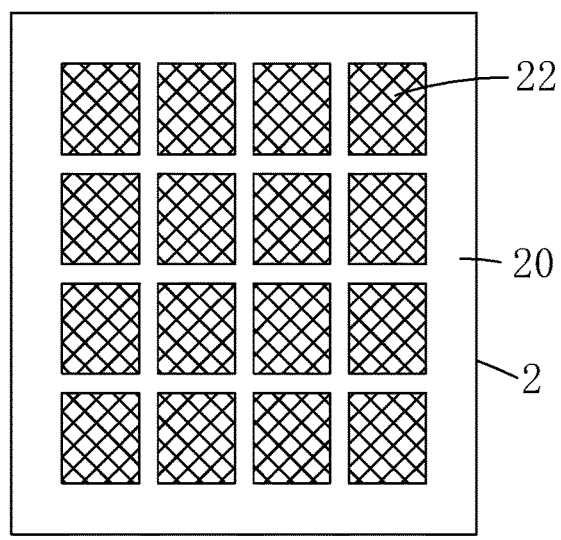

Step 4: as shown in FIGS. 6-7, providing an array substrate 2, wherein the array substrate 2 comprises a second base plate 20, a thin-film transistor layer 21 arranged on the second base plate 20, and a pixel electrode layer 22 arranged on the thin-film transistor layer 21; the pixel electrode layer 22 comprises a plurality of pixel electrodes 221 respectively corresponding to the plurality of pixel cavities 12.

Specifically, the thin-film transistor layer 21 comprises a plurality of thin-film transistors (TFTs) 211 respectively corresponding to the plurality of pixel electrodes 221.

Specifically, the second base plate 20 is a transparent plate, and preferably, the second base plate 20 is a glass plate.

Specifically, the pixel electrodes 221 are transparent electrodes, and preferably, the pixel electrodes 221 are formed of a material comprising indium tin oxide (ITO) or indium zinc oxide (IZO).

Figure 8:
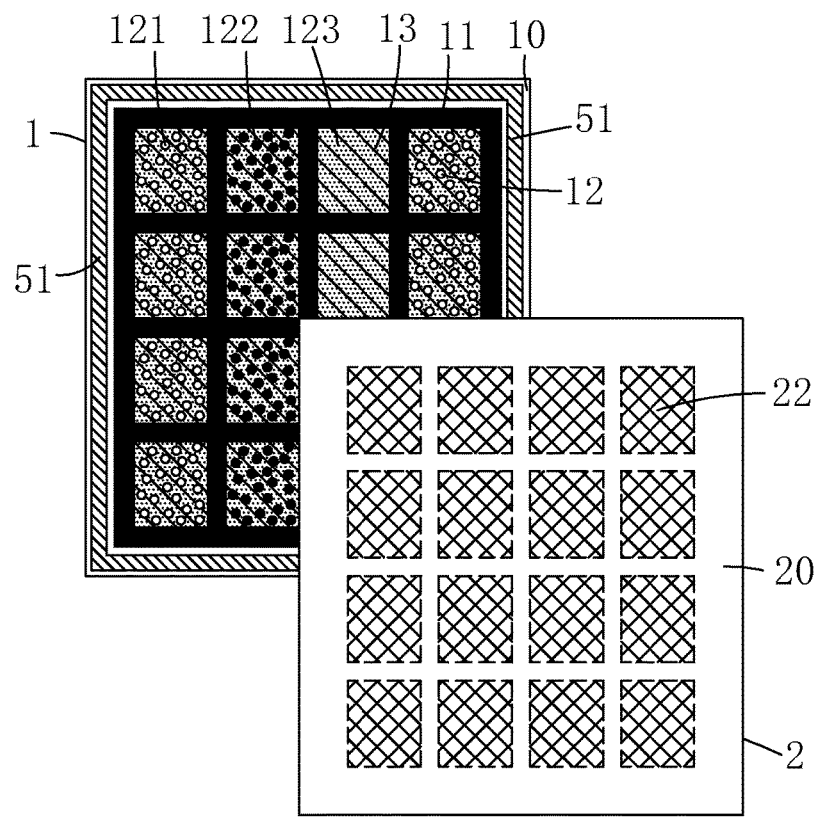
FIGS. 8 and 9 are schematic views illustrating step 5 of the method for manufacturing a PDLC display device according to the present invention.
Figure 9:
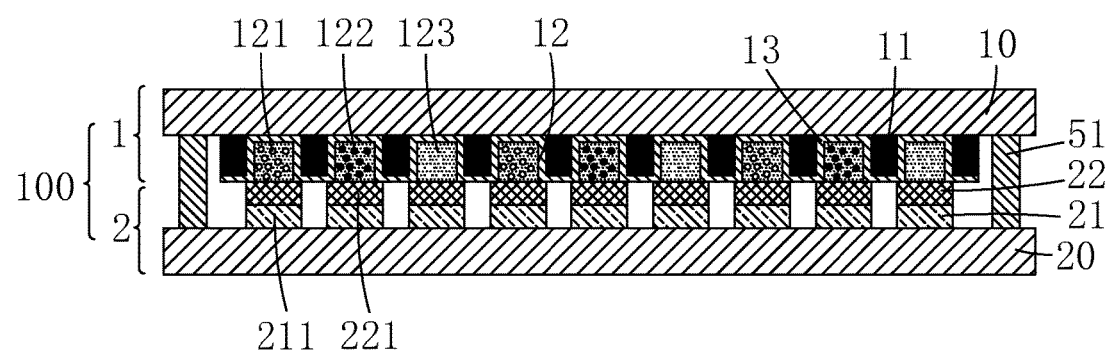

Step 5: as shown in FIGS. 8-9, coating enclosure resin 51 along a circumference of the PDLC substrate 1 or the array substrate 2 and conducting vacuum lamination of the PDLC substrate 1 and the array substrate 2 so as to form a PDLC display panel 100.

Specifically, the enclosure resin 51 contains therein spacing materials for maintaining a spacing distance between the first base plate 10 and the second base plate 20. Thicknesses of the enclosure resin 51 that contains the spacing materials mixed therein and the black matrix 11 collectively support the spacing distance between the first base plate 10 and the second base plate 20.

Figure 10:
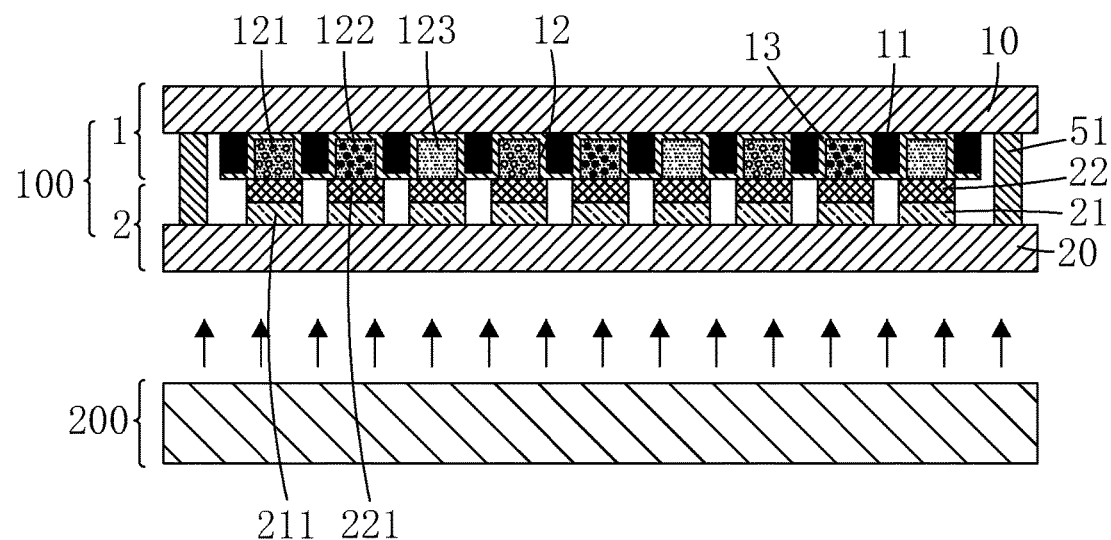
FIG. 10 is a schematic view illustrating step 6 of the method for manufacturing a PDLC display device according to the present invention and is also a schematic view illustrating a cross-sectional structure of a PDLC display device according to the present invention.

Step 6: as shown in FIG. 10, providing a backlight module 200 and combining the PDLC display panel 100 and the backlight module 200 together to form a PDLC display device, wherein the backlight module 200 emits blue light.

In the PDLC display device manufactured with the present invention, the density of the sub-pixels included in a pixel unit determines the resolution of the PDLC display device and, with blue backlighting, red, green, blue, white, and an indistinct color can be displayed, where the color becomes more distinct with an increase of voltage and exhibits an off state, namely showing a blurred and non-light-transmitting effect, when no external voltage applied. Further, the black matrix 11 provides an effect of light shielding to prevent occurrences of color mixture and light leakage of the PDLC.

In the above-described method for manufacturing a PDLC display device, a black matrix and a base plate collectively delimit a plurality of pixel cavities in such a way that every three adjacent ones of the pixel cavities form a pixel unit, and a mixture of PDLC and red QDs and a mixture of PDLC and green QDs are respectively filled into the first and second pixel cavities of the pixel unit to respectively form a red sub-pixel cavity and a green sub-pixel cavity and the third pixel cavity of the pixel unit is filled with PDLC to form a blue sub-pixel cavity, thereby forming a PDLC substrate, which is laminated with an array substrate, and combined with a blue-light backlight module to form the PDLC display device. Light leakage and color mixture that are present in a conventional PDLC display device can be eliminated and processes of alignment layers and polarizers can also be saved to thereby increase manufacturing efficiency and lower down manufacturing cost.

Referring to FIG. 10, in combination with FIGS. 1-9, the present invention also provides a PDLC display device that is manufactured with the above-described method and comprises a PDLC display panel 100 and a backlight module 200 arranged below the PDLC display panel 100.

The PDLC display panel 100 comprises a PDLC substrate 1, an array substrate 2 arranged opposite to the PDLC substrate 1, and enclosure resin 51 bonding the PDLC substrate 1 and the array substrate 2 together.

The PDLC substrate 1 comprises a first base plate 10, a black matrix 11 arranged on the first base plate 10, a common electrode 13 arranged on the black matrix 11 and the first base plate 10, a mixture of PDLC and red QDs, a mixture of PDLC and green QDs, and PDLC. The black matrix 11 and the first base plate 10 collectively delimit a plurality of pixel cavities 12, and every three adjacent ones of the pixel cavities 12 form a pixel unit, wherein first and second pixel cavities 12 of the pixel unit are respectively filled with the mixture of PDLC and red QDs and the mixture of PDLC and green QDs to respectively form a red sub-pixel cavity 121 and a green sub-pixel cavity 122, and a third pixel cavity 12 of the pixel unit is filled with the PDLC to form a blue sub-pixel cavity 122.

The array substrate 2 comprises a second base plate 20, a thin-film transistor layer 21 arranged on the second base plate 20, and a pixel electrode layer 22 arranged on the thin-film transistor layer 21; the pixel electrode layer 22 comprises a plurality of pixel electrodes 221 respectively corresponding to the plurality of pixel cavities 12.

The backlight module 200 emits blue light and the red QDs of the red sub-pixel cavity 121 and the green QDs of the green sub-pixel cavity 122, when excited by blue light, emit red light and green light respectively, while the PDLC filled in the blue sub-pixel cavity 123 allows for transmission of blue backlighting therethrough to thereby display blue color.

Specifically, the common electrode 13 and the pixel electrode 221 are both transparent electrodes, and preferably, the common electrode 13 and the pixel electrode 221 are both formed of a material comprising indium tin oxide.

Specifically, in the mixture of PDLC and red QDs and the mixture of PDLC and green QDs, a mass ratio between the red QDs or the green QDs and the PDLC is 5%-10%.

Specifically, the enclosure resin 51 contains therein spacing materials for maintaining a spacing distance between the first base plate 10 and the second base plate 20.

Specifically, the first base plate 10 and the second base plate 20 are both transparent plates, and preferably, the first base plate 10 and the second base plate 20 are both glass plates.

Specifically, the thin-film transistor layer 21 comprises a plurality of thin-film transistors (TFTs) 211 respectively corresponding to the plurality of pixel electrodes 221.

Further, in the PDLC substrate 1, each of the pixel units may comprise a white sub-pixel cavity and the white sub-pixel cavity is filled with a mixture of red QDs, green QDs, and PDLC.

Further, in the PDLC substrate 1, each of the pixel units may comprise a yellow sub-pixel cavity, and the yellow sub-pixel cavity is filled with a mixture of yellow QDs and PDLC.

In the PDLC display device according to the present invention, a PDLC substrate 1 comprises a plurality of pixel cavities 12 that are filled with PDLC to form a plurality of liquid crystal cells. The liquid crystal cells can be driven in a manner similar to that of a conventional TFT-LCD. The PDLC contained in the liquid crystal cells is controlled by an electrical voltage applied between a common electrode 13 and a pixel electrode 221 to exhibit the characteristics of a light switch, wherein with no external voltage applied, the PDLC shows an opaque or translucent state, and when driven by an external electric field, the PDLC shows transparency having a degree that is increased along a predetermined curve when the applied voltage is increased.

The PDLC display device demonstrates at least four displaying modes of red, green, blue, and indistinctness, allowing for use in applications where unique effects are required, and helping eliminate light leakage and color mixture occurring in an existing PDLC display device, and also requiring no alignment layer and polarizer so that the manufacturing efficiency is high and the manufacturing cost is low.

In summary, the present invention provides a method for manufacturing a PDLC display device, wherein a black matrix and a base plate collectively delimit a plurality of pixel cavities in such a way that every three adjacent ones of the pixel cavities form a pixel unit, and a mixture of PDLC and red QDs and a mixture of PDLC and green QDs are respectively filled into the first and second pixel cavities of the pixel unit to respectively form a red sub-pixel and a green sub-pixel and the third pixel cavity of the pixel unit is filled with PDLC to form a blue sub-pixel, thereby forming a PDLC substrate, which is laminated with an array substrate, and combined with a blue-light backlight module to form the PDLC display device. Light leakage and color mixture that are present in a conventional PDLC display device can be eliminated and processes of alignment layers and polarizers can also be saved to thereby increase manufacturing efficiency and lower down manufacturing cost. The PDLC display device of the present invention that is manufactured with the above-described method demonstrates at least four displaying modes of red, green, blue, and indistinctness, allowing for use in applications where unique effects are required, and helping eliminate light leakage and color mixture occurring in an existing PDLC display device, and also requiring no alignment layer and polarizer so that the manufacturing efficiency is high and the manufacturing cost is low.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A method for manufacturing a polymer dispersed liquid crystal (PDLC) display device, comprising the following steps:
(1) providing a first base plate, coating a black matrix material on the first base plate, and subjecting the black matrix material to a patterning operation to form a black matrix, wherein the first base plate and the black matrix collectively delimit a plurality of pixel cavities;

(2) forming a common electrode on and completely covering the black matrix, the plurality of pixel cavities, and the first base plate;

(3) providing a mixture of PDLC and red quantum dots (QDs), a mixture of PDLC and green QDs, and PDLC; and, with every three ones of the pixel cavities that are adjacent to each other collectively defining a pixel unit, filling the mixture of PDLC and red QDs and the mixture of PDLC and green QDs into first and second pixel cavities of the pixel unit to respectively form a red sub-pixel cavity and a green sub-pixel cavity, and filling the PDLC into a third pixel cavity of the pixel unit to form a blue sub-pixel cavity, thereby forming a PDLC substrate;

(4) providing an array substrate, wherein the array substrate comprises a second base plate, a thin-film transistor layer arranged on the second base plate, and a pixel electrode layer arranged on the thin-film transistor layer; the pixel electrode layer comprises a plurality of pixel electrodes respectively corresponding to the plurality of pixel cavities;

(5) coating enclosure resin along a circumference of the PDLC substrate or the array substrate and conducting vacuum lamination of the PDLC substrate and the array substrate so as to form a PDLC display panel; and (6) providing a backlight module and combining the PDLC display panel and the backlight module together to form a PDLC display device, wherein the backlight module emits blue light;

wherein the black matrix is formed on a surface of the first base plate such that the back matrix covers a first portion of the surface of the first base plate and a second portion of the surface of the first base plate is exposed and wherein the common electrode is formed on the black matrix and the first base plate such that the common electrode covers an exposed surface of the black matrix and the second portion of the surface of the first base plate and the black matrix is interposed between the common electrode and the base plate.

2. The method for manufacturing a PDLC display device as claimed in claim 1, wherein in step (2), the common electrode is formed through sputtering.

3. The method for manufacturing a PDLC display device as claimed in claim 1, wherein the common electrode and the pixel electrode are both transparent electrodes.

4. The method for manufacturing a PDLC display device as claimed in claim 1, wherein in the mixture of PDLC and red QDs and the mixture of PDLC and green QDs provided in step (3), a mass ratio between the red QDs or the green QDs and the PDLC is 5%-10%.

5. The method for manufacturing a PDLC display device as claimed in claim 1, wherein in step (5), the enclosure resin contains therein spacing materials that maintain a spacing distance between the first base plate and the second base plate.

6. A polymer dispersed liquid crystal (PDLC) display device, comprising a PDLC display panel and a backlight module arranged below the PDLC display panel;

wherein the PDLC display panel comprises a PDLC substrate, an array substrate arranged opposite to the PDLC substrate, and enclosure resin bonding the PDLC substrate and the array substrate together;

the PDLC substrate comprises a first base plate, a black matrix arranged on the first base plate, a common electrode arranged on the black matrix and the first base plate, a mixture of PDLC and red quantum dots (QDs), a mixture of PDLC and green QDs, and PDLC; and the black matrix and the first base plate collectively delimit a plurality of pixel cavities, and every three adjacent ones of the pixel cavities form a pixel unit, wherein first and second pixel cavities of the pixel unit are respectively filled with the mixture of PDLC and red QDs and the mixture of PDLC and green QDs to respectively form a red sub-pixel cavity and a green sub-pixel cavity, and a third pixel cavity of the pixel unit is filled with the PDLC to form a blue sub-pixel cavity;

the array substrate comprises a second base plate, a thin-film transistor (TFT) layer arranged on the second base plate, and a pixel electrode layer arranged on the thin-film transistor layer; and the pixel electrode layer comprises a plurality of pixel electrodes respectively corresponding to the plurality of pixel cavities; and the backlight module emits blue light; and the red QDs of the red sub-pixel cavity and the green QDs of the green sub-pixel cavity, when excited by blue light, emit red light and green light respectively, while the PDLC filled in the blue sub-pixel cavity allows for transmission of blue backlighting therethrough to thereby display blue color;

wherein the black matrix is formed on a surface of the first base plate such that the back matrix covers a first portion of the surface of the first base plate and a second portion of the surface of the first base plate is exposed and wherein the common electrode is formed on the black matrix and the first base plate such that the common electrode covers an exposed surface of the black matrix and the second portion of the surface of the first base plate and the black matrix is interposed between the common electrode and the base plate.

7. The PDLC display device as claimed in claim 6, wherein the common electrode and the pixel electrode are both transparent electrodes.

8. The PDLC display device as claimed in claim 6, wherein in the mixture of PDLC and red QDs and the mixture of PDLC and green QDs, a mass ratio between the red QDs or the green QDs and the PDLC is 5%-10%.

9. The PDLC display device as claimed in claim 6, wherein the enclosure resin contains therein spacing materials for maintaining a spacing distance between the first base plate and the second base plate.

10. The PDLC display device as claimed in claim 6, wherein the first base plate and the second base plate are both transparent plates.

11. A polymer dispersed liquid crystal (PDLC) display device, comprising a PDLC display panel and a backlight module arranged below the PDLC display panel;

wherein the PDLC display panel comprises a PDLC substrate, an array substrate arranged opposite to the PDLC substrate, and enclosure resin bonding the PDLC substrate and the array substrate together;

the PDLC substrate comprises a first base plate, a black matrix arranged on the first base plate, a common electrode arranged on the black matrix and the first base plate, a mixture of PDLC and red quantum dots (QDs), a mixture of PDLC and green QDs, and PDLC; and the black matrix and the first base plate collectively delimit a plurality of pixel cavities, and every three adjacent ones of the pixel cavities form a pixel unit, wherein first and second pixel cavities of the pixel unit are respectively filled with the mixture of PDLC and red QDs and the mixture of PDLC and green QDs to respectively form a red sub-pixel cavity and a green sub-pixel cavity, and a third pixel cavity of the pixel unit is filled with the PDLC to form a blue sub-pixel cavity;

the array substrate comprises a second base plate, a thin-film transistor (TFT) layer arranged on the second base plate, and a pixel electrode layer arranged on the thin-film transistor layer; and the pixel electrode layer comprises a plurality of pixel electrodes respectively corresponding to the plurality of pixel cavities; and the backlight module emits blue light; and the red QDs of the red sub-pixel cavity and the green QDs of the green sub-pixel cavity, when excited by blue light, emit red light and green light respectively, while the PDLC filled in the blue sub-pixel cavity allows for transmission of blue backlighting therethrough to thereby display blue color;

wherein the black matrix is formed on a surface of the first base plate such that the back matrix convers a first portion of the surface of the first base plate and a second portion of the surface of the first base plate is exposed and wherein the common electrode is formed on the black matrix and the first base plate such that the common electrode covers an exposed surface of the black matrix and the second portion of the surface of the first base plate and the black matrix is interposed between the common electrode and the base plate;

wherein the common electrode and the pixel electrode are both transparent electrodes;

wherein in the mixture of PDLC and red QDs and the mixture of PDLC and green QDs, a mass ratio between the red QDs or the green QDs and the PDLC is 5%-10%;

wherein the enclosure resin contains therein spacing materials for maintaining a spacing distance between the first base plate and the second base plate; and wherein the first base plate and the second base plate are both transparent plates.

* * * * *